United States Patent
Letwin et al.

(10) Patent No.: US 10,099,705 B2
(45) Date of Patent: Oct. 16, 2018

(54) CONTROL SYSTEM FOR AUTONOMOUS-CAPABLE VEHICLES

(71) Applicant: Uber Technologies, Inc., San Francisco, CA (US)

(72) Inventors: Nicholas Letwin, Pittsburgh, PA (US); Morgan Jones, Pittsburgh, PA (US); Michael Sergi-Curfman, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 31 days.

(21) Appl. No.: 15/252,152

(22) Filed: Aug. 30, 2016

(65) Prior Publication Data
US 2017/0057520 A1  Mar. 2, 2017

Related U.S. Application Data

(60) Provisional application No. 62/212,577, filed on Aug. 31, 2015.

(51) Int. Cl.
*B60W 50/08* (2012.01)
*G05D 1/00* (2006.01)

(52) U.S. Cl.
CPC ......... *B60W 50/082* (2013.01); *G05D 1/0061* (2013.01); *B60W 2510/18* (2013.01); *B60W 2510/20* (2013.01); *B60W 2540/04* (2013.01); *B60W 2600/00* (2013.01); *G05D 2201/0213* (2013.01)

(58) Field of Classification Search
CPC .......................... B60W 50/082; G05D 1/0061
See application file for complete search history.

(56) References Cited

U.S. PATENT DOCUMENTS

| | | | |
|---|---|---|---|
| 2003/0236935 A1* | 12/2003 | Amemiya | G06F 9/451 710/260 |
| 2011/0241862 A1* | 10/2011 | Debouk | B60W 50/035 340/439 |
| 2013/0002416 A1 | 1/2013 | Gazit | |
| 2013/0226428 A1 | 8/2013 | Nihei et al. | |
| 2014/0156133 A1 | 6/2014 | Cullinane et al. | |
| 2014/0303827 A1* | 10/2014 | Dolgov | B60W 30/00 701/23 |
| 2015/0025731 A1* | 1/2015 | Uehara | G05D 1/00 701/23 |
| 2015/0210290 A1* | 7/2015 | Hemes | B60W 50/082 701/36 |

FOREIGN PATENT DOCUMENTS

JP    2013-507673    3/2013

OTHER PUBLICATIONS

ISR and Written Opinion issued in PCT/US2016/049736 dated Dec. 16, 2016.

* cited by examiner

*Primary Examiner* — Jess Whittington
(74) *Attorney, Agent, or Firm* — Mahamedi IP Law LLP

(57) ABSTRACT

An autonomous-capable vehicle which can be operated in a transitional state from manual vehicle operation to autonomous vehicle operation. In the transitional state, the vehicle operates autonomously and overrides manual interaction of the user. To maintain the transitional state, the driver performs a continuous action, such as providing a continuous interaction with a switching mechanism.

10 Claims, 3 Drawing Sheets

CONTROL SYSTEM FOR AUTONOMOUS-CAPABLE VEHICLES

RELATED APPLICATIONS

This application claims benefit of priority to Provisional U.S. Patent Application No. 62/212,577, filed Aug. 31, 2015; the aforementioned priority application being hereby incorporated by reference in its entirety.

TECHNICAL FIELD

Examples described herein relate a control system for autonomous-capable vehicles.

BACKGROUND

Autonomous vehicles refers to vehicles which replace human drivers with sensors and computer-implemented intelligence, sensors and other automation technology. Under existing technology, autonomous vehicles can readily handle driving with other vehicles on roadways such as highways.

DETAILED DESCRIPTION

Figure 1:
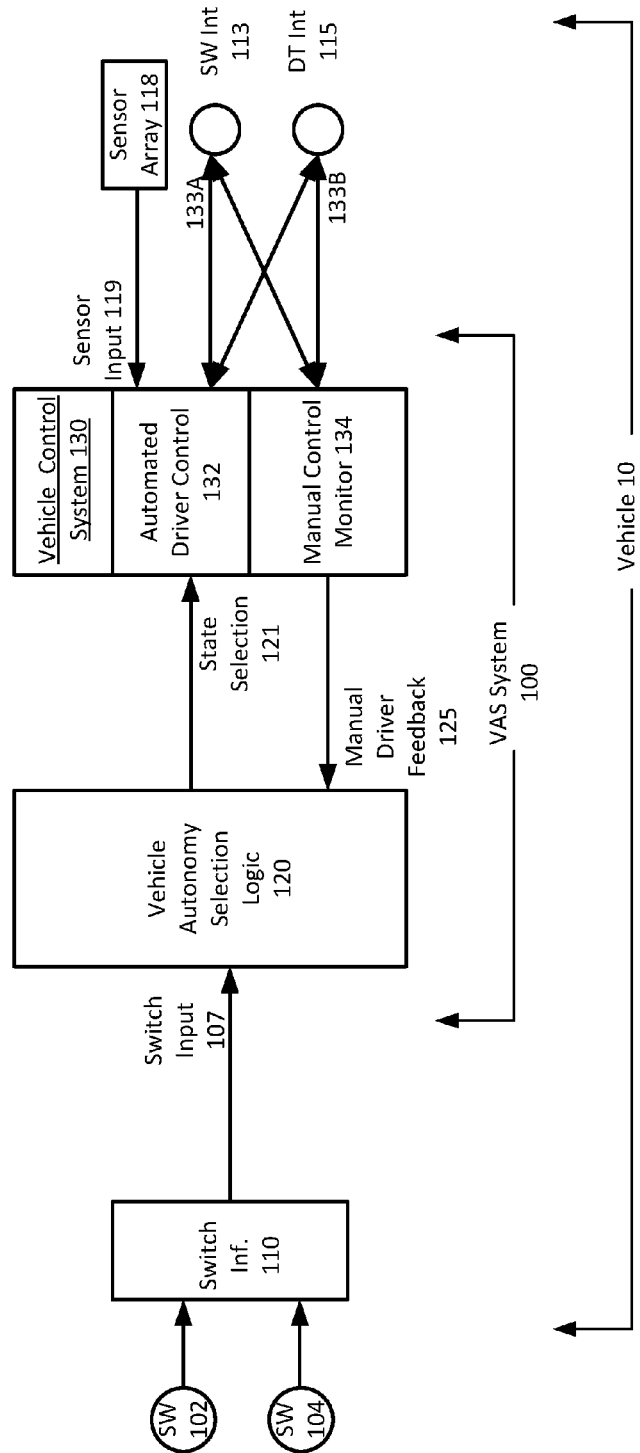
FIG. 1 illustrates an example system for operating an autonomous-capable vehicle.

Examples provide for an autonomous-capable vehicle which can be operated in a transitional state that can be implemented between manual and autonomous vehicle operations. In the transitional state, the vehicle operates autonomously and overrides manual interaction by the user. To maintain the transitional state, the driver performs a continuous action (e.g., continuous button press or actuation), such as providing a continuous interaction with a switching mechanism.

Examples described herein include a control system for autonomous-capable vehicles. In particular, some examples include a control system for enabling vehicles to more safely or efficiently transition from manual to autonomous control of a vehicle, where the autonomous control is initially implemented to include a transition state where manual user operation of the vehicle is temporarily ignored. As described, in some examples, a driver can perform a single continuous action to maintain a switching state after when the vehicle is switched into a state in which operation is autonomous. The driver can perform the designated action in order to maintain the vehicle in autonomous mode of operation, and manual actions would otherwise interfere with vehicle control are ignored.

According to one example, a control system for an autonomous vehicle includes switch interface logic and vehicle autonomy control logic. The switch interface logic determines switching input from a user operation of one or more switching mechanisms (e.g., input mechanisms, buttons, etc.). The vehicle autonomy selection logic controls an operational state of a vehicle control system based on the switching input. For example, the operational state can include (i) a first control state in which autonomous control is enabled but not engaged, (ii), a second control state in which autonomous control is engaged and the vehicle control system ignores manual control input for the vehicle, and (iii) a third control state in which autonomous control is engaged and subject to being disengaged by manual control input for the vehicle control system. The vehicle autonomy selection logic switches from the first control state to the second control state upon detecting switching input in which at least one of the one or more switching mechanisms is actively engaged by the driver.

Among other benefits, examples as described enable an operator of a vehicle to transition the vehicle from a manual mode of operation to an autonomous mode by performing a designated action continuously over a sufficient period of time to enable an inference that the action is deliberate. The continuous action can, for example, correspond to a single discrete and sustained action that extends for a given threshold of time. In alternative examples, the continuous action can correspond to a series of repetitive actions, which when performed over a given duration of time, collectively form the continuous action. The period of time may also be selected to allow for an inference that one or more preconditions (e.g., human is in correct seating posture) are satisfied for enabling a transition to occur safely and effectively.

In some examples, the designated action can provide a mechanism for which the driver can indicate readiness to cease control of the autonomous vehicle. In the event the driver needs to disengage the autonomous control, the driver can cease performing the designated action and further perform another action to disengage the autonomous control, such as tapping the brakes. Additionally, examples as described enhance safety of autonomous-capable vehicles in that they enable a transition state where the user can ensure autonomous control is ensured before "letting go."

Numerous examples are referenced herein in context of an autonomous vehicle or autonomous-capable vehicle. An autonomous vehicle refers to any vehicle which is operated in a state of automation with respect to at least steering, propulsion and braking. When operated in an autonomous operational state, examples provide that a vehicle may ignore human or manual driving input (e.g., accelerator or brake input, steering wheel input), such that the vehicle control system is the only "driver" of the vehicle. As described with various examples, the vehicle may ignore human or manual driving input when the vehicle is in an autonomous operational state, with exception that the vehicle may respond to designated human inputs such as inputs to switch the operational state of the vehicle or to take a safety action (e.g., emergency brake). As described with various examples, the designated human inputs which can transition the operational state of the vehicle may be with detected with respect to interfaces (e.g., mechanical actuators) that are not used for driving the vehicle. Thus, the interface for enabling a human driver to switch the state of the autonomous vehicle may be separate from mechanisms such as steering wheels, accelerators (e.g., "gas pedals"), brakes, or gear shifters.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are examples of machines and devices that utilize processors, memory, and instructions stored on computer-readable mediums. Additionally, aspects may be implemented in the form of computer programs.

System Overview

FIG. 1 illustrates an example system for operating an autonomous-capable vehicle using vehicle autonomy selection (VAS) system. A (VAS) system 100 such as shown by an example of FIG. 1 can be implemented in a variety of vehicular environments, such as autonomously driven automobiles and machinery, as well as remote controlled devices (e.g., drones). An autonomously driven vehicle can operate without human action which would otherwise operate the vehicle. For example, in the context of automobiles, an autonomously driven vehicle can steer, accelerate and brake. An autonomous-capable vehicle, as referred to herein, corresponds to a vehicle that can be operated either autonomously or manually.

In an example of FIG. 1, the VAS system 100 can be a modularized set of components for a vehicle 10 which includes separate or independent capabilities for enabling autonomous control. In variations, the VAS system 100 can be integrated with the vehicle control system 130, so that the vehicle control system 130 is included as part of the VAS system 100. Likewise, the switching mechanisms 102 and 104 can also be included as integrated or modularized components of the VAS system 100. In variations, the switching mechanisms 102 and 104 can be provided as separate or independent components of the vehicle 10.

With reference to FIG. 1, the VAS system 100 is implemented for a vehicle 10 and includes switch interface logic 110 and switch logic, shown as autonomy selection logic 120, for switching the operational state of the vehicle between alternative control states. Each of the switch interface logic 110 and the autonomy selection logic 120 can be implemented using integrated circuits and/or processing resources (e.g., processor or processors) that execute programming (e.g., firmware). The VAS system 100 can interface with a set of switching mechanisms, shown as switching mechanisms 102 and 104. More or fewer selection mechanisms may be utilized. The autonomy selection logic 120 can interface with the vehicle control system 130, which can include automated driver control 132 and manual control monitor 134. When the vehicle 10 is operated autonomously, the automated driver control 132 can implement autonomous control operations to control the vehicle 10 when the vehicle 10 is in motion. In controlling the vehicle 10, the automated driver control 132 can generate control signals 133A, 133B for operational facets of the vehicle 10, such as the steering wheel (which can be controlled via a steering interface 113) and the accelerator and/or brake (which can be controlled via any one or multiple drivetrain interfaces 115).

When the automated driver control 132 is operating to implement autonomous control of the vehicle 10, the automated driver control 132 can receive numerous forms of input for enabling driver operations, including sensor input 119 from a sensor array (or a combination of sensor devices) 118. By way of example, the sensor array 118 can include one or more of video cameras, stereoscopic pairs of cameras or depth perception cameras, long range cameras, remote detection sensors such as provided by radar or Lidar, proximity or touch sensors, and/or sonar sensors. The automated driver control 132 can utilize sensor input 119 to operate the drivetrain or motor of the vehicle (e.g., accelerate, break, maintain velocity, etc.), steer and/or operate other components, such as lights and turn signals.

When the vehicle 10 is operated manually, the manual control monitor 134 can operate to detect manipulation of driver control mechanisms by the driver (e.g., turning of the steering wheel, pedal press, brake press, etc.). The manual control monitor 134 can further operate to generate manual driver feedback 125 in response to human interaction. As described with other examples, the autonomy selection logic 120 can detect switch inputs 107 and other conditions or events in order to selectively implement switching of the vehicle control system 130.

According to some examples, the switch interface logic 110 interfaces with the switching mechanisms 102, 104 in order to determine a respective switching state. The switch interface logic 110 can communicate the switching states of each of the switching mechanisms 102, 104 as switch input 107 to the autonomy selection logic 120. The autonomy selection logic 120 can signal state selection 121 in order to select the vehicle operational state of the vehicle control system 130. The state selection 121 can be based on the switch input 107 and/or other input, such as user interaction with manual controls of the vehicle. In some examples, state selection 121 selects the vehicle operational state to be one of multiple possible control states which include (i) autonomous control disabled, (ii) autonomous control enabled and disengaged, (iii) autonomous control engaged and transitional, and (iv) autonomous control enabled and engaged.

Figure 2:
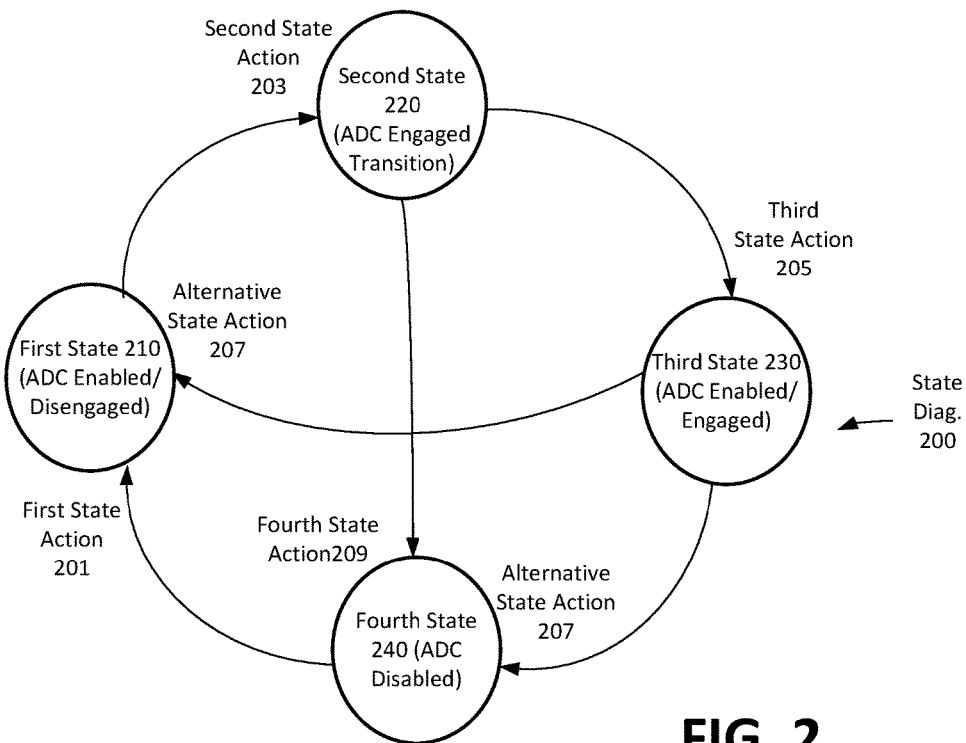
FIG. 2 is example of a state diagram to illustrate operation of a control system for autonomous-capable vehicles.

As described with an example of FIG. 2, the autonomy selection logic 120 can, for at least select instances, use the switch input 107 to determine the state selection 121 that defines the vehicle operational state of the vehicle control system 130. According to some aspects, the distinction between when autonomous control is enabled versus engaged is based on an additional condition or event, such as provided by the switch input 107. Thus, for example, when autonomous control is disabled, two distinct actions or events (e.g., as provided by the switch input 107) may be needed in order to engage autonomous control for the vehicle, while only one action or event may be needed to enable the autonomous control when it is enabled but not engaged. Each of the switch inputs 107 can be provided by a designated type of human action, sufficient to, for example, clearly indicate a user intent.

In variations, the switching mechanism 102 and/or 104 can be configured structurally or electronically so that various switch inputs 107 are possible or enabled through different human interactions. For example, each of the switching mechanisms 102, 104 can correspond to a mechanical actuator or switch, such as provided by a button, knob, or touch/force sensor. A user can interact with each switching mechanisms 102, 104 in order to generate a desired switch input 107. In variations, one or more of the switching mechanisms 102, 104 can correspond to an inferred or sensed input. For example, the switching mechanism 102 or 104 can correspond to a sensor that can detect a user's movement or motion and then set the switch input 107 accordingly. Still further, in some variations, select vehicle operational states can be determined automatically or by default. For example, the vehicle 10 can operate in an autonomous mode by default, or perform actions such as sensing whether any human is in the driver seat, in order to determine what vehicle operational state to initiate operation in. Subsequently, a user interaction with one or more of the switching mechanisms 102, 104 results in a change in the vehicle operation state.

The autonomy selection logic 120 can select the vehicle operational state to enable or disable autonomous control of the vehicle via the automated driver control 132, for a given instance of time while the vehicle 10 is on a trip. When the autonomous control is enabled, the autonomy selection logic 120 can further interpret the switch input 107 to determine whether the autonomous control was engaged or disengaged. According to some examples, autonomous control is made active (or made in use) when the autonomous control is enabled and then engaged. The transition from enabled (e.g., "on") to engaged (e.g., "on and active") can include an additional switch input 107 corresponding to an additional or distinct user interaction with one or more of the switching mechanisms 102, 104. The various vehicle operation states can be conditionally sequenced based on switch input 107 and/or other factors, such as described by an example of FIG. 2.

Moreover, events or actions other than switch input 107 can cause the autonomy selection logic 120 to signal a change to the state selection 121. In some implementations, the VAS system 100 can use the manual control monitor 134 to monitor for driver interaction with the vehicle when the vehicle operational state is autonomous. If, for example, driver interaction is detected which alters the manner in which the vehicle 10 is driven (as compared to how the automated driver control 132 would drive the vehicle in that same instance), then the autonomy selection logic 120 can signal the state selection 121 to cause the automated driver control 132 to disable or disengage, so as to permit manual driver control. For example, if the autonomy selection logic 120 detects the driver turning the steering wheel or pressing the brake, the autonomy selection logic 120 can cause the vehicle 10 to transition automatically from the autonomous operation to the manual operation. Still further, in some implementations, the VAS system 100 can include safety features such as a feature to automatically switch off autonomous control when any one or more conditions are detected that indicate the automated driver control 132 is malfunctioning or being nonresponsive to manual override.

Methodology

FIG. 2 is example of a state diagram to illustrate operation of a control system for autonomous-capable vehicles. In particular, a state diagram 200 of FIG. 2 illustrates an example implementation of the autonomy selection logic 120 of the example of FIG. 1, which can make programmatic decisions to select the vehicle operational state as implemented by the vehicle control system 130. The autonomy selection logic 120 can make decisions to select the vehicle operational state based on various inputs and conditions, including the switch input 107 and/or manual driver feedback 125. Accordingly, in describing an example of FIG. 2, reference may be made to elements of FIG. 1 for purpose of illustrating suitable components or functionality for implementing an example is described.

In an example of FIG. 2, the vehicle control state can include a first control state 210 corresponding to the automated driver control logic 132 being enabled and disengaged when the vehicle 10 is made operational, a second control state 220 corresponding to the automated driver control logic 132 being engaged and in transition, a third control state 230 corresponding to the automated driver control logic 132 being enabled and engaged, and a fourth control state 240 corresponding to the automated driver control logic 132 being disabled. More or fewer vehicle operational states can be implemented in variations to an example of FIG. 2. When the vehicle 10 is made operational, the vehicle can operate in a default or initial operational state. The selection of the default or initial operational state can be one of design or preference. For purpose of an example described, the default or initial operational state can correspond to the first control state 210 (autonomous driver control enabled and disengaged). Alternatively, the default state can correspond to the fourth control state 240 (autonomous driver control disabled). In variations, the default state can correspond to one in which the autonomy selection logic 120 is disabled.

In an example of FIG. 2, a pair of switching mechanisms (e.g., the switching mechanisms 102, 104 of FIG. 1) can be employed to enable at least some state switching with respect to the vehicle operational state. The pair of switching mechanisms 102, 104 can, for example, be implemented as a combination of push (and/or pull) buttons. The first control state 210 can be implemented on, for example, ignition, and/or in response to a first state action 201 in which the vehicle operation state transitions from the fourth control state 240 to the first control state 210. The first state action 201 can correspond to the user, for example, manipulating a first switching mechanism 102 (e.g., pull button up to an engaged position). In one example, when the first state action 201 is detected, the sensors and/or the automated driver control of the vehicle can be initiated (or turned on) and/or calibrated to prepare the vehicle for autonomous operation. The second state action 203, for triggering the autonomy selection logic 120 to implement the second control state 220 (e.g., autonomy selection logic 120 signals automated driver control 132 to engage), can be implemented by, for example, the user providing a continuous interaction with a designated one of the switching mechanisms 102, 104. For example, in an implementation in which the switching mechanisms 102 and 104 correspond to push or pull buttons, the second control state 220 can be implemented by the switch mechanism 104 being subjected to a continuous action, such as a press and hold by the user for a given duration of time. A third control state 230, corresponding to the vehicle 10 being driven autonomously may follow the second control state 220. A third state action 205 can trigger the transition from the second vehicle operational state to the third operational state. The third state action 205 can correspond to, for example, the user ceasing the continuous action of the second control state 220 (e.g., user takes finger off button). In the third control state 230, the autonomy selection logic 120 is responsive to manual driver feedback 125, which can correlate to an intent of the driver to take control of the vehicle.

In one example, the second control state 220 can correspond to a transition state between a manual driven state (e.g., first control state 210 corresponding to the autonomy selection logic 120 being enabled but disengaged) and an autonomous driven state (e.g., third control state 230 corresponding to the autonomy selection logic 120 being enabled and engaged). More specifically, while the continuous action is being performed by the driver with respect to the switching mechanisms 102, 104, the driver interaction with the various control mechanisms of the vehicle can be ignored. Among other benefits, the implementation of the second control state 220 provides a safety mechanism for the driver to transition from manual operation to autonomous operation, in that the driver does not have to be concerned that inadvertent, unintentional or test-type interaction with the vehicle control system (e.g., the driver taps the brakes to measure play, etc.) will disrupt the autonomous vehicle operational state. Rather, in the second control state 220, the driver performs a continuous action that is not directly related to manual operation of the vehicle. This provides a safety mechanism by which the driver can communicate intent to transition to an autonomous driven state irrespective of manual interaction which may be inadvertent or made for purposes other than switching to manual operation. In contrast, when in the third control state 230, the driver can elect to transition to the first control state 210 (e.g., from autonomous to manual driven) by tapping the brakes or performing some other action coinciding with the driver taking control of the vehicle. In the third control state 230, the driver is no longer providing continuous interaction with one of the switching mechanisms 102, 104, thus the driver interaction overrides the autonomous control and the autonomy selection logic 120 can switch to disengage the automated driver control 132. Likewise, in variations, the driver can transition from the third control state 230 to the first control state 210 or fourth control state 240 through an alternative state action 207. The alternative state action 207 can coincide with the driver interacting with one of the switching mechanisms 102, 104. For example, the driver can interact with the switching mechanism 102 (e.g., pull up) to cause the autonomy selection logic 120 to disengage the automated driver control 132, and causing the vehicle 10 to be subject to manual control.

In still another variation, a fourth control state action 209 can switch the vehicle operational state from the second control state 220 to the fourth control state 240 automatically in response to a condition that is indicative of failure of a manual override feature. For example, a user's continuous action with respect to one of the switching mechanisms can be subject to a predetermined time limit. If the continuous action exceeds a time limit, one or more safety responses can be initiated, including switching from the second control state 220 to the fourth control state 240 (or alternatively to the third control state 230). In this way, for example, if a button press of the second state action 203 malfunctions and maintains a depressed or activated state, the duration in which the buttons which can remain malfunctioned is limited, so that manual control can be returned to the driver. Other types of safety responses can also be initiated, such as requiring the user to perform a second continuous action rather to maintain the first continuous action. While the safety response can be directed to ensuring that the particular switching mechanism 102, 104 receiving the continuous action is not malfunctioning, the specific response (e.g., disengage automated driver control 132, have driver perform alternative continuous action, etc.) can be determined based on the environment.

Figure 3:
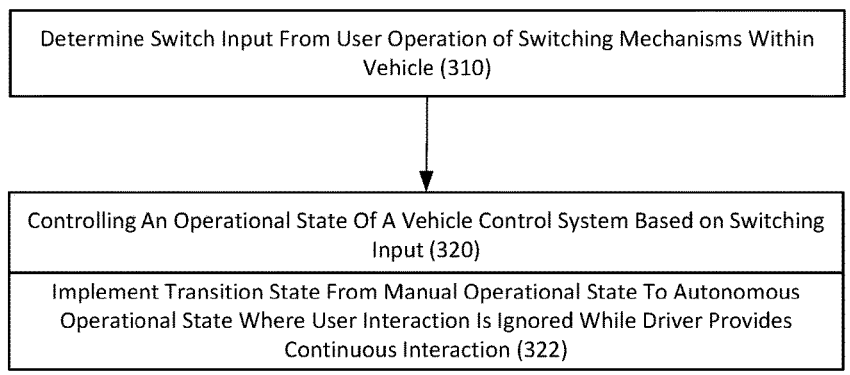
FIG. 3 illustrates an example method for operating an autonomous-capable vehicle.

FIG. 3 illustrates an example method for operating an autonomous-capable vehicle. In describing an example method of FIG. 3, reference may be made to elements of FIG. 1 for purpose of illustrating a suitable component or element or performing a step or sub-step being described.

With reference to an example of FIG. 3, a switch input is determined from user operation of a switching mechanism(s) within the vehicle (310). The switching mechanism can correspond to two or more switches, which can define multiple alternative vehicle operational states. The switching mechanism can be dedicated, shared with other functionality, or used with other types of logic. Still further, the switching mechanism can be implemented in part programmatically, based on conditions or events which are detected to processing of sensory input, environmental conditions, operational environment etc.

An operational state of a vehicle control system 130 can be controlled by, for example, autonomy selection logic 120, based on the switching input (320). The vehicle operational state can correspond to, for example, an operational state such as described with an example of FIG. 2. At least one of the vehicle operation states can correspond to a transition state, as between manual and autonomous operational states, in which the user may perform a continuous action with respect to at least one of the switching mechanisms 102, 104 (322).

Computer System

Figure 4:
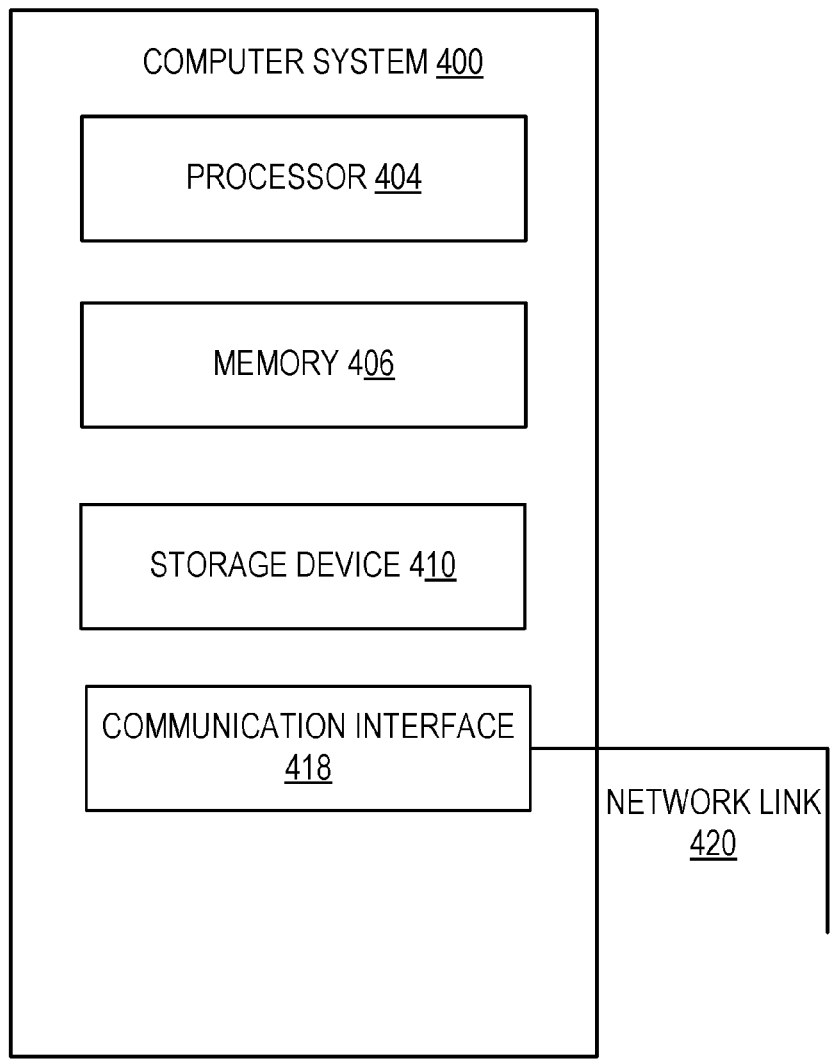
FIG. 4 is a block diagram that illustrates a computer system upon which aspects described herein may be implemented.

FIG. 4 is a block diagram that illustrates a vehicle computer system upon which aspects described herein may be implemented. For example, in the context of FIG. 1, the VAS system 100 may be implemented using a computer system 400 as described by FIG. 4. Accordingly, the computer system 400 of FIG. 4 can be implemented within the confines of a vehicle in order to enable autonomous control, as well as selection of vehicle operational state, as described by various examples.

In an example, computer system 400 includes processor 404, memory 406 (including non-transitory memory), storage device 410, and communication interface 418. Computer system 400 includes at least one processor 404 for processing information. Computer system 400 also includes the main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. The storage device 410, such as a magnetic disk or optical disk, is provided for storing information and instructions. The communication interface 418 may enable the computer system 400 to communicate with one or more networks through use of the network link 420 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks). In the context of a vehicle, the network link can include a wireless interface to enable network communications through, for example, cellular channels.

Examples described herein are related to the use of computer system 400 for implementing the techniques described herein. According to one implementation, those techniques are performed by computer system 400 in response to processor 404 of the vehicle 10 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other aspects. Thus, absence of describing combinations should not preclude the inventor(s) from claiming rights to such combinations.

What is claimed is:

1. An autonomous-capable vehicle comprising:
   one or more manual vehicle control mechanisms;
   an autonomous control system to autonomously operate the autonomous-capable vehicle when engaged;
   a first interface to engage the autonomous control system when an operator of the autonomous-capable vehicle interacts with the first interface;
   a vehicle control system that is operational in multiple control states, including (i) a first control state in which the autonomous control system is enabled but not engaged, (ii) a second control state in which the autonomous control system is engaged but operator manipulation of the one or more manual vehicle control mechanisms does not disengage the autonomous control system, and (iii) a third control state in which the autonomous control system is engaged and operator manipulation of the one or more manual vehicle control mechanisms disengages the autonomous control system; and
   vehicle autonomy selection logic to change a control state of the multiple control states of the vehicle control system based on an operator interaction with the first interface,
   wherein the vehicle autonomy selection logic changes the vehicle control system from the first control state to the second control state upon detecting the operator interaction with the first interface,
   and wherein the vehicle autonomy selection logic changes the vehicle control system from the second control state to the third control state upon detecting cessation of the operator interaction with the first interface.

2. The autonomous-capable vehicle of claim 1, wherein the one or more manual vehicle control mechanisms include a brake pedal, an accelerator pedal, a gear shifter, and a steering wheel.

3. The autonomous-capable vehicle of claim 1, wherein the multiple control states include a fourth control state in which the autonomous control system is disabled.

4. The autonomous-capable vehicle of claim 3, wherein the vehicle autonomy selection logic changes the vehicle control system from the second control state to the fourth control state when the operator interaction exceeds a threshold time period without cessation.

5. The autonomous-capable vehicle of claim 1, further comprising:
   a second interface to enable and disable the autonomous control system.

6. The autonomous-capable vehicle of claim 1, wherein the first interface is a button.

7. A control system for an autonomous-capable vehicle, the control system comprising:
   an autonomous control system to autonomously operate the autonomous-capable vehicle when engaged;
   a vehicle control system that is operational in multiple control states, including (i) a first control state in which the autonomous control system is enabled but not engaged, (ii) a second control state in which the autonomous control system is engaged but operator manipulation of one or more manual vehicle control mechanisms does not disengage the autonomous control system, and (iii) a third control state in which the autonomous control system is engaged and operator manipulation of the one or more manual vehicle control mechanisms disengages the autonomous control system; and
   vehicle autonomy selection logic to change a control state of the multiple control states of the vehicle control system based on an operator interaction with a first interface,
   wherein the vehicle autonomy selection logic changes the vehicle control system from the first control state to the second control state upon detecting the operator interaction with the first interface,
   and wherein the vehicle autonomy selection logic changes the vehicle control system from the second control state to the third control state upon detecting cessation of the operator interaction with the first interface.

8. A method for operating an autonomous-capable vehicle, the method being implemented by one or more processors and comprising:
   determining switching input from an operator interaction with a first interface; and
   controlling an operational state of a vehicle control system based on the switching input, the operational state including (i) a first control state in which an autonomous control system is enabled but not engaged, (ii), a second control state in which the autonomous control system is engaged but operator manipulation of manual vehicle control mechanisms does not disengage the autonomous control system, and (iii) a third control state in which the autonomous control system is engaged and operator manipulation of the manual vehicle control mechanisms disengages the autonomous control system,
   wherein controlling the operational state includes changing from the first control state to the second control state upon detecting the operator interaction with the first interface,
   wherein controlling the operational state includes changing from the second control state to the third control state upon detecting cessation of the operator interaction with the first interface.

9. The autonomous-capable vehicle of claim 6, wherein the operator interaction comprises the operator pressing the button without releasing the button.

10. The autonomous-capable vehicle of claim 9, wherein the cessation of the operator interaction comprises the operator releasing the button.

* * * * *